June 22, 1937. R. A. SCHAFER 2,084,562
TIMING RELAY FOR MACHINE TOOLS
Filed Dec. 2, 1932 8 Sheets-Sheet 4

Inventor
Robert A. Schafer
By Attorneys
Nathan, Bowman & Helfrich

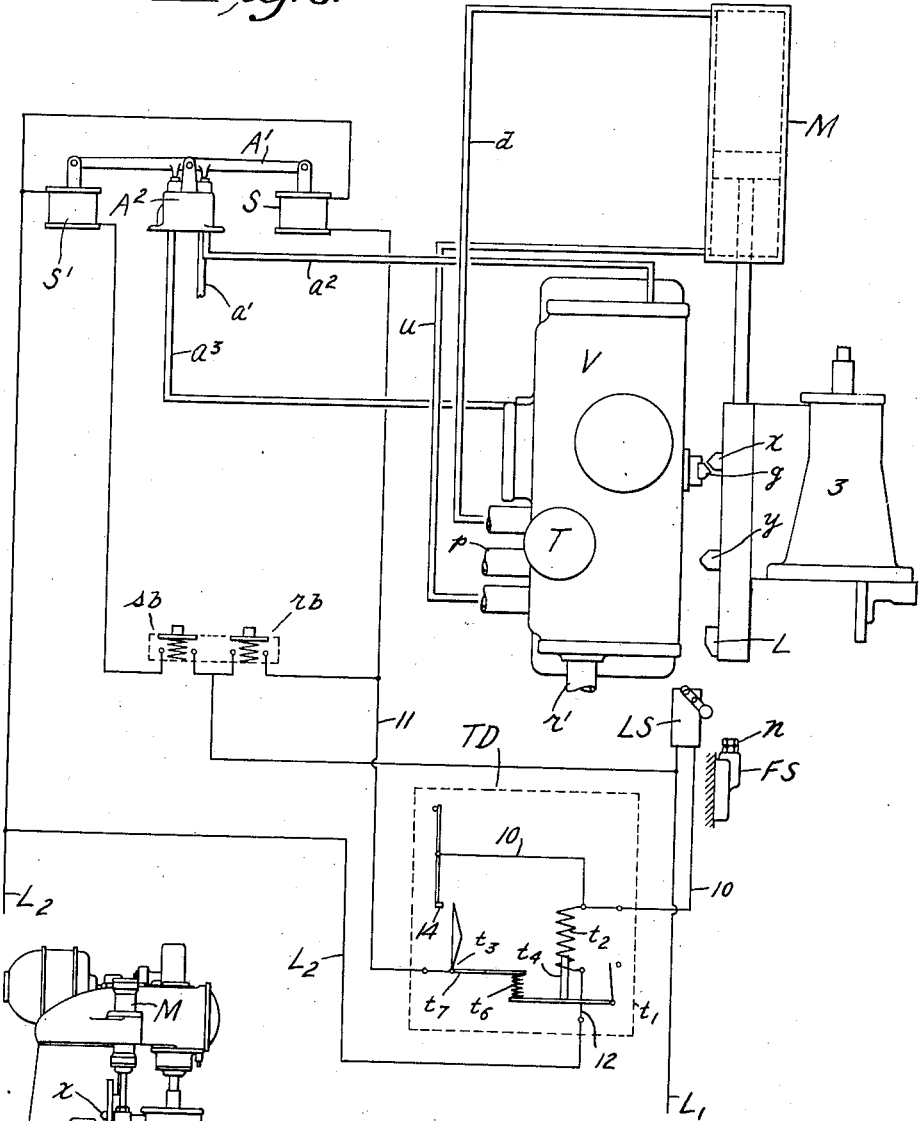

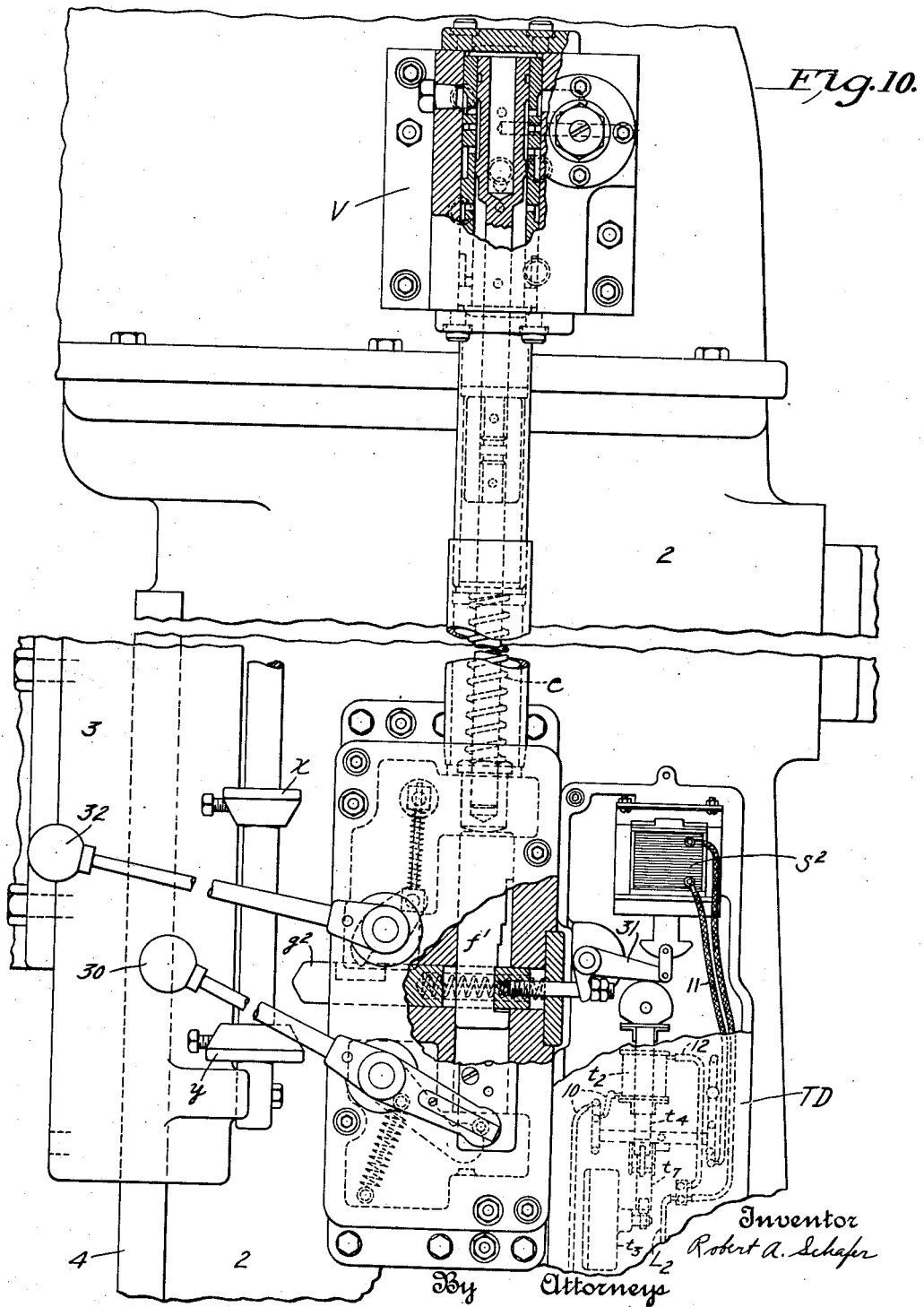

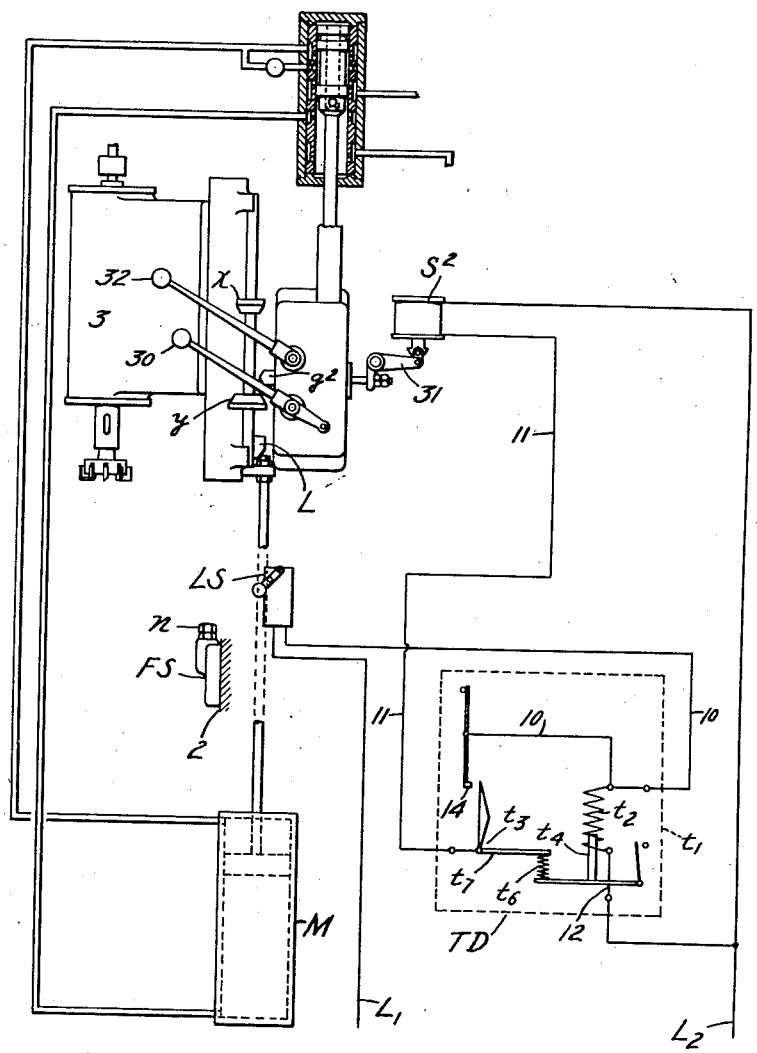

Patented June 22, 1937

2,084,562

UNITED STATES PATENT OFFICE 2,084,562

TIMING RELAY FOR MACHINE TOOLS

Robert A. Schafer, Richmond, Ind., assignor to The National Automatic Tool Company, Richmond, Ind., a corporation of Indiana Application December 2, 1932, Serial No. 645,433

4 Claims. (Cl. 77—32)

The present invention relates to machine tools and more particularly to those types of machines falling within the class generally referred to as drilling or boring machines. The invention has for its primary object to incorporate in such a machine a mechanism which operates automatically to produce a dwell in the movement between tool and workpiece at the end of the feed, so that the tool may produce a plane and finished surface on the workpiece before the reverse movement between tool and workpiece is effected.

Heretofore, it is common practice in a drilling or boring machine to feed the tool carriage against a trip device of a nature designed to effect instant reversal thereof. To accomplish that purpose, various forms of load-and-fire devices, carry-over mechanisms etc., have been employed, each of which rely upon the movement of the translated member to furnish the motive power necessary to disconnect the forward feed and throw in the reverse. This immediate reversal, it will be seen, interrupts the cut and does not allow the tool to machine a perfectly smooth surface. During a normal feed any given point on a rotating tool obviously will inscribe a helical path relative to the work and, hence, if the forward motion is instantly reversed as was heretofore common, the contour of the surface machined is left in the form of one convolution of a helix.

In machining operations, such as, for example, counterboring, countersinking, facing etc., wherein the surface being finished is usually at right angles to the direction of feed, it is eminently desirable that a dwell or delay be given to the movement of the tool at the end of the normal forward feed movement so that the tool may make at least one complete revolution without axial movement thereby to finish a flat surface before the reverse is thrown in.

The movements of the tool head or carriages of automatic or semi-automatic machines are usually governed or controlled by tripping means which were actuated by the movement of the translated member, but with such machines the stopping of the forward motion, unless a carryover mechanism was employed, eliminated the necessary additional motion required to actuate the reverse trips. In facing operations, and other operations of similar nature, there should not, of course, be any additional further motion forward after the required depth is reached.

Such operations, it will be apparent, require certain consideration not usually necessary on such operations as drilling and analogous operations and it is the aim of the present invention to provide a mechanism, by the aid of which, operations such as counterboring, facing etc., may be smoothly and accurately effected with a conventional drilling machine.

With that end in view it is proposed to provide an improved automatically actuated and controlled trip mechanism for a machine tool arranged in such manner that the tool head or carriage is caused to perform automatically its normal cycle of rapid traverse and feed movements and to come to a definite stop at the end of the forward feed. The mechanism is so arranged that the tools continue operating on the work, without further forward movement, for a definite period of time and at the expiration of the time period the reversing mechanism is actuated automatically and causes the tools to withdraw or recede from the work. In this way there is provided means for effecting the dwell in a machining operation essential to the producing of accurate work. From a practical standpoint, a machine having an hydraulically propelled carriage lends itself very readily to this manner of operation for the reason that the carriage may be moved against a positive or fixed stop and held there by the continued application of fluid pressure without detrimental effects upon the hydraulic system.

Prior, however, to the engagement of the carriage with the fixed stop, it is proposed to have a trip mechanism (which may be carried in part by the carriage) actuated or set in motion a relay device which operates, after a definite time interval and independently of any movement of the carriage, to throw in the reversing mechanism. The mechanism is so arranged that during the time intervening the tripping in of the relay and the actual reverse movement of the carriage, the carriage will have been brought to a stop against the fixed abutment and held there for the required period of time, while the tool or tools continue their operation and thus produce a square or perfectly flat finish upon the workpiece.

A few attempts have been made in the past to effect a dwell at the end of a feed, but as such devices relied upon the alertness of the operator to throw in the reverse or upon an impositive mechanical device such as a checked fluid flow cylinder or dash-pot arrangement, they were very unsatisfactory and unreliable in operation for a number of reasons. Chief among these is the fact that they required the constant vigilance of the operator, acted differently under different temperature conditions, and because of dirt, grit etc., were susceptible to derangement and became out-of-order very quickly.

It is a further aim of this invention to construct a delayed reversing mechanism that eliminates all inequalities in finished workpieces and one that may readily be adapted to various types of machines and relied upon to stop the forward motion of the tool at the exact position required and to effect a withdrawal thereof after the tool has taken one or more finishing cuts on the workpiece.

To that end I have arranged a machine in a manner such that the final movement of the carriage closes the circuit of and sets in operation an electric relay time device. After a predetermined time, depending upon the setting of the relay, the latter closes a circuit to an electromagnetic valve, switch, clutch or other suitable reversing mechanism and the carriage is automatically reversed. The tools, which have not stopped rotating are thus permitted to take at least one complete cut upon the work which finishes the operation perfectly smooth and flat.

In actual practice the delayed reversing mechanism may assume numerous varied forms as the particular machine to which it is applied or the exigencies of the tooling operation seem to warrant, and, while but a few of the various forms and modifications thereof are disclosed herein for the purpose of illustrating several embodiments, it will be understood that other combinations may readily be made.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 7 is a side view of another type of machine tool incorporating the present invention but in which the starting of the machine is electrically controlled by means of a push button.

Fig. 8 is a schematic diagram of the hydraulic system and electrical control circuit therefor for a machine such as illustrated in Fig. 7.

Fig. 10 is an enlarged view of a portion of an hydraulically actuated machine tool in which the main control valve is adapted to be manually loaded, and in which the delayed reversing device includes a solenoid actuated trip mechanism which when operated at the proper time causes the head to reverse.

Fig. 11 is a schematic diagram of the hydraulic and electrical systems for such a machine.

Figure 1:
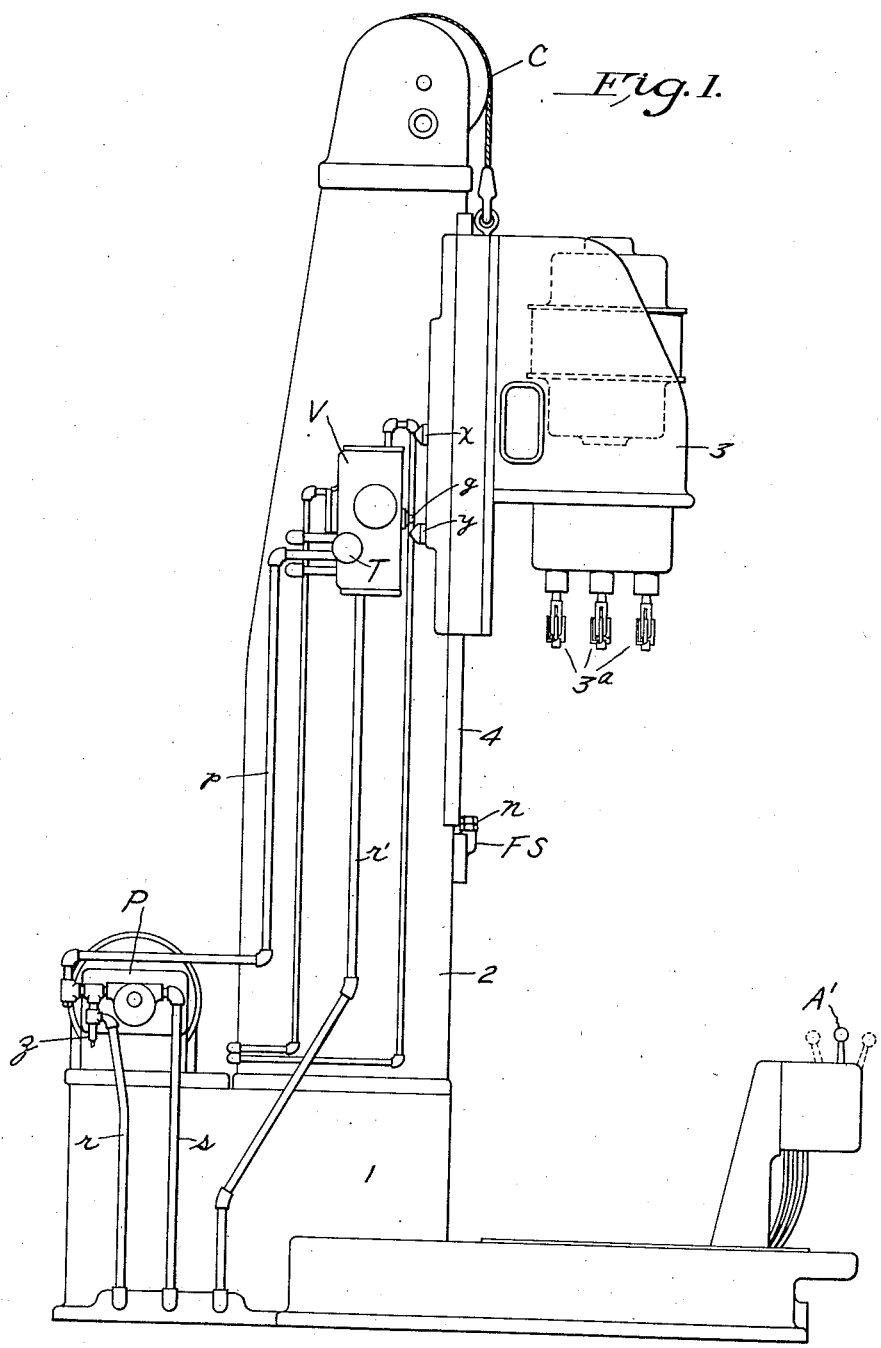
Figure 1 is a side elevation of a representative type of machine tool incorporating the present invention. The starting lever therefor being located at the forward side of the machine within convenient reach of the operator.
Figure 2:
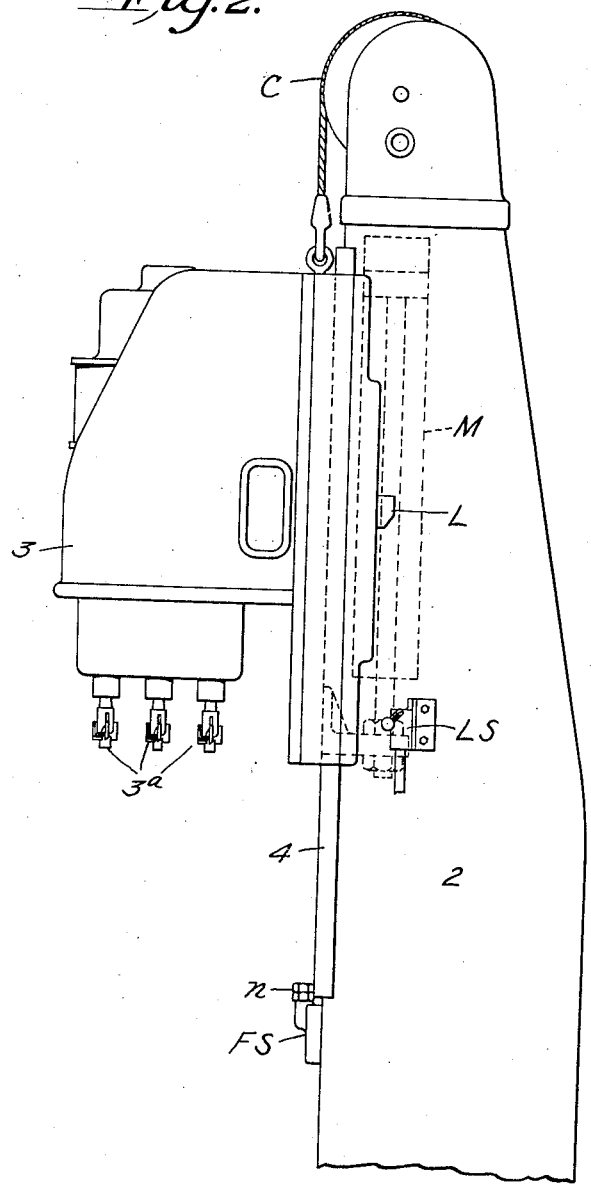
Fig. 2 is a fragmentary view of the same machine but illustrating the opposite side thereof and showing the approximate relative position of the limit switch.
Figure 3:
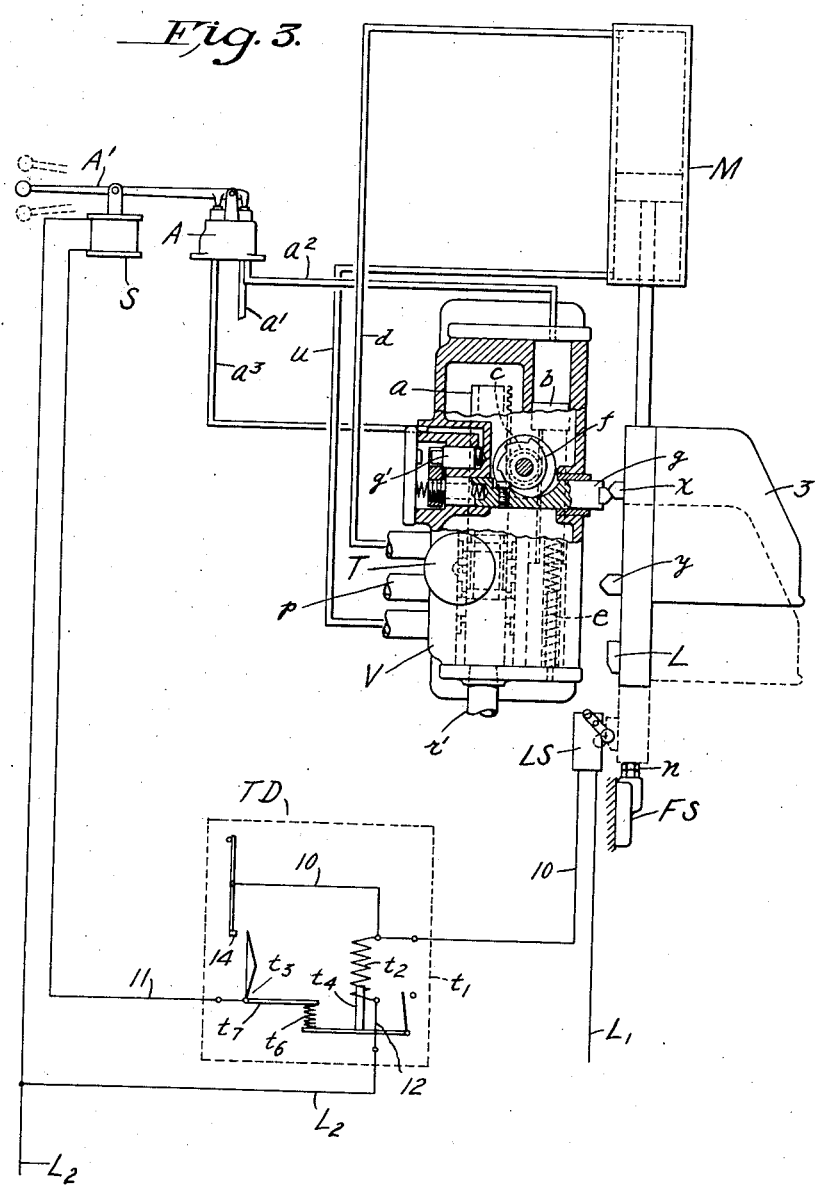
Fig. 3 is a schematic figure illustrating the hydraulic system for the tool head of Figs. 1 and 2 and the electrically controlled circuit for the timing device and solenoid controlled thereby.

Referring now more particularly to Figs. 1, 2 and 3, this invention is shown embodied in an upright drill having a base member 1, an upright column 2, and a translatable spindle head 3 in which is journaled suitable tool spindles 3ª. The head 3 is adapted to be moved along the guideways 4 by means of a hydraulic motor M that receives fluid under pressure from a pump P. A direction and rate control valve V, connected in series with pump and motor, is actuated by means of suitable trip mechanism in timed relation with the movement of the head and controls its cycle of movements.

The valve itself and its mode of operation is more fully set forth in United States Patent No. 1,780,471 and, therefore, need be but briefly explained here. For the present purpose it will suffice to remark that it comprises a valve plunger $a$ and an actuating plunger $b$ having a rack and pinion connection $c$ therebetween. The plunger $b$ is, in the present embodiment, adapted to be shifted in opposition to a spring $e$ by air under pressure derived from any suitable source. A standard Ross air valve A, located convenient to the operator, is employed to control the air line.

When the handle A' of the Ross air valve is moved forward (toward the operator) the plunger $b$ is shifted to its extreme position and the valve plunger $a$ is moved to its extreme position where it is latched by the latch mechanism $f$ and $g$.

The pump P derives fluid through pipe-line $s$ from the reservoir located in the machine base and discharges same through line $p$ to the valve V. When the valve is positioned, as above explained, the fluid is directed through line $d$ to the upper end of the motor M and the head 3 is propelled downwardly at a relatively rapid rate.

The forward movement continues at that rate until a feed dog $x$ engages and moves the trip element $g$ inwardly one position. The cam element $f$ which was held by the element $g$ now turns under the action of the spring $e$ and the valve plunger is shifted by the spring to its feed position. The pressure fluid, which heretofore had an open passageway to the upper end of the motor, is now directed through the throttle T and then to line $d$ and the upper end of the motor. The throttle T may, of course, be adjusted to give any desired feed rate, the excess fluid supplied by the pump being by-passed to the reservoir through an adjustable relief valve $z$ and line $r$.

The head proceeds downward at the feed rate selected, the tools carried by the spindle or spindles performing their normal operations on the workpiece, until the head engages a normally fixed stop FS. The fixed stop, which is adjustable on the column to suit the requirements of the operation prevents further forward movement of the head and since the pressure is still "on" on the upper side of the motor, the head is firmly held against the stop without any resulting back-lash. The stop FS is also provided with adjusting means $n$ so that exceedingly close or fine adjustments may be made.

Before the head 3 engages the fixed stop an additional dog L, carried by the head, engages and actuates a limit switch LS which sets in operation a positive acting timing device TD hereinbefore referred to. After a predetermined time interval has elapsed the timing device operates to close or complete the circuit of a solenoid S that is connected with the lever A' of the Ross air valve A. When the solenoid is energized it moves the valve lever to the position opposite to that of starting, and air under pressure is admitted from the supply line $a'$ to the line $a^3$ and thence to the chamber behind a plunger $g'$. The plunger $g'$, as described in the aforesaid patent, is operatively connected to the trip plunger $g$ and when moved by the air pressure withdraws the trip plunger $g$ one step further and the cam element $f$ turns to another position shifting the valve stem $a$ to a position effecting rapid traverse return of the tool head.

When the hydraulic valve is in the "reverse" position oil under pressure from the line $p$ passes unrestricted through the valve to the line $u$ and to the lower end of the motor cylinder thus causing a retraction of the tool head. During movement of the motor M, in either direction, the fluid discharged thereby passes back through the valve and through line $r'$ to the reservoir as will be understood.

The head 3 continues moving away from the work until a dog $y$ carried thereby engages and moves the valve trip bar $g$ one position further. This further movement of the trip bar allows the cam $f$ to turn (under the action of the spring $e$) and the valve plunger $a$ is shifted to a new position such that pressure fluid is cut off from the lower end of the motor and same passes to the reservoir through line $r'$. The movement of the head thus comes to rest at the upper end of its travel and remains there until a new cycle is initiated. Counterbalancing means indicated generally at C is provided to counteract the weight of the head during any position thereof of rest or motion.

In cases of emergency, or for any other reason it is desired to reverse the movement of the head at any point or period in its cycle, the lever A' may be moved manually to its "reverse" position and the above explained reversing and stopping occurs.

The foregoing explains, in a general way, the operation and functioning of this invention as embodied in a machine in which the tool head is propelled hydraulically and in which the control valve therefor is air loaded and controlled manually to start the cycle of movements of the head or tools. After the air valve control lever has been actuated to start the movement, the head continues through its prearranged cycle of rapid traverse forward, feed, positive stop, delayed positive reverse, followed by a rapid traverse return, and again stops but this time at the upper end or limit of its travel.

The positive acting timing device insures that the starting of the head on its reverse movement does not take place until after the head engages the fixed stop and after the time interval has expired. Knowing the speed of rotation of the tool or tools, the time device may be readily set to delay the reverse until the surface being machined is finished perfectly flat or smooth. Such a mechanism, it will be seen, is positive in its action, is not subject to any control by the operator, and is invariable in the performance of its functions, delaying the return movement for the exact period each time. A machine so equipped increases its production capacity by eliminating waste time, prevents inequalities in work, and renders the entire machine organization completely automatic and reliable in its operation.

The electrical circuit and elements of the timing device TD are diagrammatically illustrated in Fig. 3 and more in detail in Figs. 4, 5, 6 and 10.

The timing device may consist of a spring actuated escapement movement such as used in a time clock or an electrical timer actuated by frequency impulses or any other suitable and positive acting timing mechanism. I have preferred, however, to use a conventional and standard type of time relay, which is adjustable to effect the desired dwell or delay.

Figure 4:
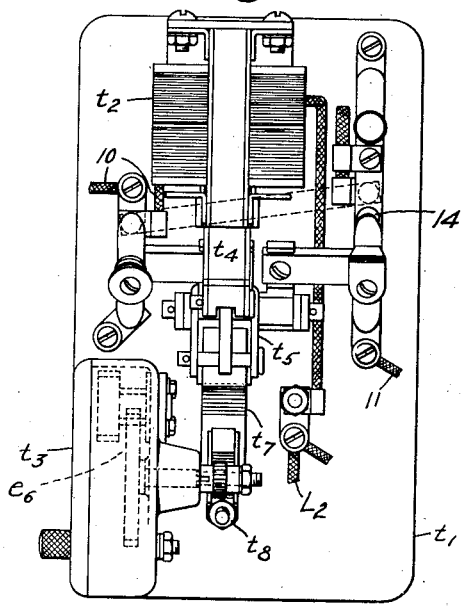
Figs. 4 and 5 are front and side views respectively of a preferred form of timing device adaptable for a machine of this kind.
Figure 5:
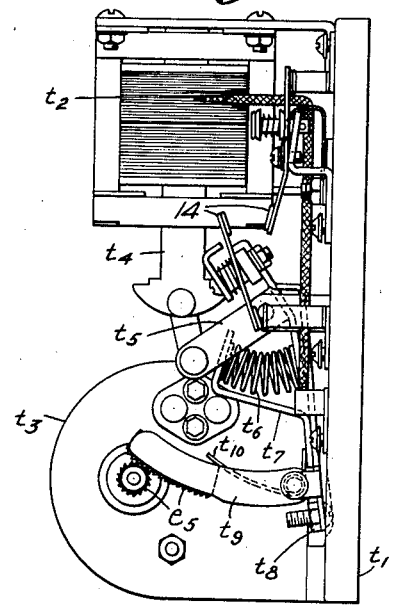
Figure 6:
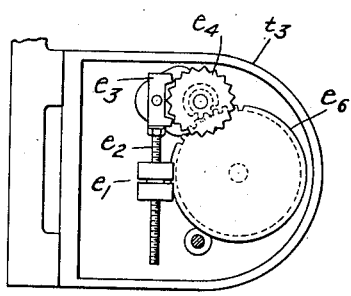
Fig. 6 is a detail view of the escapement device of the mechanism illustrated in Figs. 4 and 5.

Referring to Figs. 4, 5 and 6, it will be noted, that the timing device comprises essentially a base member $t_1$, upon which is mounted a solenoid $t_2$ and an escapement mechanism indicated generally as $t_3$. The armature $t_4$ of the solenoid has its outer end connected to one arm of a bell-crank lever $t_5$. The other arm of the lever $t_5$ engages a spring $t_6$ and which in turn engages one arm of an L-shaped escapement actuating lever $t_7$. Thus when the solenoid is energized, the armature thereof picks up and compresses the spring $t_6$. The spring tends to move the lever $t_7$ and the latter moves at a rate determined by the setting of the escapement device $t_3$. This device comprises a swinging pendulum, the weight or weights $e_1$ on the escapement shaft $e_2$ being adjustable thereon to effect the desired operation. The pivoted end of the escapement shaft $e_2$ has secured thereto the usual click pawl $e_3$ which engages the teeth of a notched wheel $e_4$. The wheel $e_4$ is rotated by the forward movement of the lever $t_7$, through a rack and gear connection $e_5$ and speed change gearing $e_6$.

As illustrated in the drawings the projecting pivoted arm of lever $t_7$ is provided with one-way acting rack teeth extending a portion of its length and which are adapted to engage complementally formed teeth on the driven pinion. When the spring $t_6$ has moved the lever so its rack teeth clears the teeth of the pinion of the escapement device, the lever is moved rapidly to its extreme position. This final rapid movement of the lever $t_7$ closes contacts 14 which completes the electrical circuit to the reverse solenoid S (through lines 10 and 11) and the control lever of the air valve A is moved thereby to the reverse position.

When the solenoid $t_2$ of the timing device is de-energized as by the opening of the limit switch LS as the head recedes, the armature $t_4$ drops and moves the lever $t_7$ to its starting position. During the return movement of the lever $t_7$, which may be controlled by an adjusting screw $t_8$, the rack teeth on the swinging portion $t_9$ thereof ride over the teeth of the pinion. A small spring $t_{10}$ normally maintains the rack teeth in engagement with the teeth on the pinion during movement of the lever in a forward direction.

When the contacts 14 are closed and solenoid S energized, and the air valve control lever actuated as above explained, air under pressure then enters the cylinder behind piston $g'$ and the plunger $g$ of the hydraulic control valve is withdrawn and the valve is shifted automatically to its rapid traverse return position. The head member 3, thereupon moves rapidly away from the fixed stop FS until the stop dog $y$ becomes effective as hereinbefore explained.

The invention, as hereinbefore stated, is capable of being readily embodied or adapted to other types of control devices as for example, those of a machine in which the main hydraulic control valve is controlled by an electrically operated four-way air valve. Such an embodiment is represented by Figs. 7 and 8 in which, for purposes of simplicity, the same reference numerals and description heretofore used in connection with Figs. 1–6 are used insofar as they are applicable.

This machine differs from the preceding machine in that two hydraulic motors, one located at each side of the head, are employed for propelling the tool head, and the motor for driving the spindle or spindles is mounted upon the column instead of on the head. The hydraulic system is similar to that used in the preceding machine and, therefore, need not be explained in detail. Suffice it to say that the Ross air valve $A^2$ is adapted to be actuated electrically to effect a loading of the main valve V to start the forward movement of the tool head as well as to effect a releasing of the valve to reverse of the movement of the tool head.

To that end a starting solenoid $S'$ is mechanically connected with one end of the valve lever $A'$, and electrically connected with a start buttion $sb$, and power lines $L_1$ and $L_2$. Thus, when it is desired to start the machine on its cycle of operation, the push button $sb$ is pressed which completes the circuit to the starting solenoid $S'$. The lever $A'$ is rocked and the air valve actuated to admit air to the cylinder behind the valve actuating plunger $b$ (See Fig. 3). The hydraulic valve V is thus reset and the tool head starts forward on its cycle. Thereafter the "feed" is thrown in, as previously explained, and the head continues its forward movement at a feed rate until the fixed stop FS is reached. Prior to the engagement with the fixed stop the limit switch LS is actuated and positive acting timing device TD is set in operation, which after a predetermined time interval closes the switch 14 and completes the circuit to the reversing solenoid S. When the reverse solenoid S of the air valve $A^2$ is operated, and air admitted to the rear of piston $g^1$ of the hydraulic valve V, plunger $g$ is thereupon retracted and the valve plunger $a$ shifted to its reverse position causing the tool head to be retracted from the work.

Should it be desired or necessary to retract the tool head at any time or point in its cycle a second push button $rb$ is provided which is connected in parallel with the timing device. The pressing of the push button $rb$, at any time, shunts the timing device, and effects movement of the air valve lever $A'$ to a position which causes, through the mechanism previously explained, the rapid traverse reverse of the tool head.

With such a construction the air control valve, valve actuating solenoids and timing device may be located on the machine adjacent the mechanism that they control or at any other convenient location and it is only the control buttons $sb$ and $rb$ that need be positioned or located within convenient and ready reach of the operator.

Figure 9:
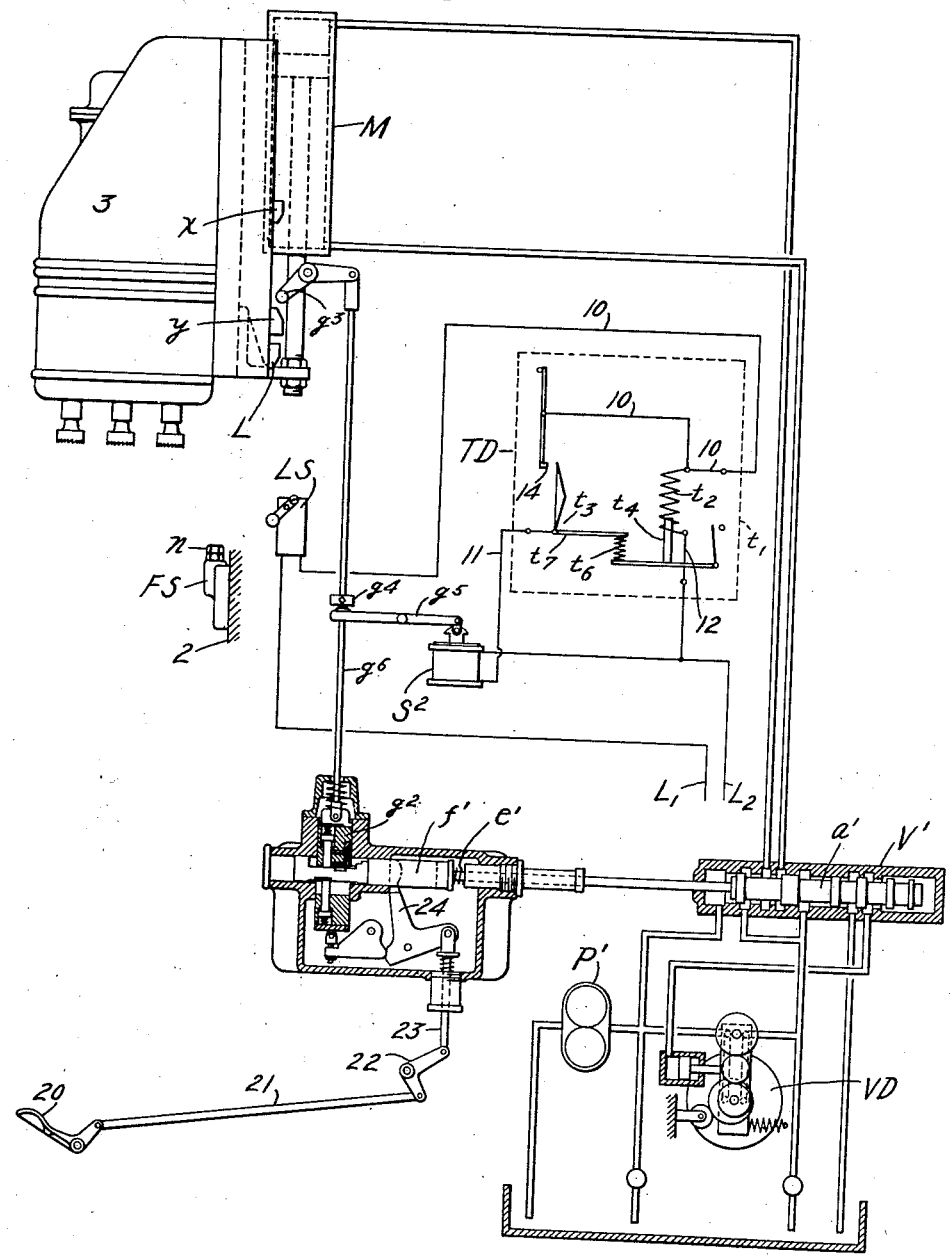
Fig. 9 is a schematic diagram of a similar type of hydraulically actuated machine tool in which the delayed reverse mechanism functions to actuate a trip bar that controls the position of the main valve. In this type of machine the main valve is manually loaded or set by means of a foot treadle.

The present invention is also applicable to a machine tool such as the type illustrated in detail in Patent No. 1,946,503 issued February 13, 1934 and Patent No. 1,979,710 issued November 6, 1934. The former of these types of machines is illustrated, in its essential features in Fig. 9, wherein 3 represents the tool head and spindle drive motor, M the hydraulic motor for imparting feed and traverse movements thereto, V' the control valve which controls the rate and direction of flow of fluid to the motor M from the variable delivery and constant displacement pumps VD and P' respectively. Briefly, the operation of such a machine is as follows: the operator depresses the foot treadle 20, which through the linkages 21, 22, 23, and 24 shifts the valve plunger $a'$ of the control valve V' to the right and stores power in the spring $e'$. So long as the operator maintains the foot treadle depressed the tool head remains stationary.

After the treadle is released, however, the valve plunger $a'$ is moved forward one position and the ports are so connected that fluid is directed to the motor M and the head starts its downward movement at a rapid rate. Feed dog $x$, which is adjustably carried on the head, next engages the roller $g^3$ and elevates the interference bar $g^2$ one step and the spring $e'$ urges the valve plunger $a'$ over one position further. This repositioning of the valve effects a reduction in the rate of flow of fluid to the motor M and the latter continues to move forward at the feed rate desired. The tool head feeds forward at that rate, the tools performing their intended functions on the workpiece, until the fixed stop FS is reached. The engagement with the fixed stop prevents further forward movement of the tools and they are held in that position by the continued application of the hydraulic pressure. Before the head engages the fixed stop, however, the limit switch LS is engaged and actuated by the dog L on the tool head and the positive acting timing device is set in operation. After a given time interval, the time device closes the circuit to the reverse solenoid $S^2$ and same becomes energized.

In the instant case the solenoid armature is connected to one end of a pivoted lever $g^5$, the other end of which underlies an adjustable stop $g^4$ secured to an extension $g^6$ of the interference bar $g^2$ and when the solenoid $S^2$ is energized the lever $g^5$ is rocked and the interference bar $g^2$ elevated to a position such that the latch bar $f'$ and valve plunger $a'$ is permitted to move to the left to a new position. Pressure fluid is then directed to the opposite side of the motor M and the head recedes at a rapid rate.

The next trip dog to become effective is the dog $y$ which rocks lever $g^3$, elevates the interference member $g^2$ and allows the valve plunger to move to the "stop" position and the head comes to rest at the upper end of its travel.

The foregoing explains the manner of delaying the reverse movement of a tool or tool head in an hydraulically propelled machine in which the main valve is manually loaded as by means of a foot treadle. Figs. 10 and 11 illustrate the application of this invention to a machine in which a hand actuated lever resets the main valve, and in which a different type of hydraulic system is used to effect the desired movements of the tool head and spindle. This type of machine is more fully explained in the second of the above mentioned patents to which reference may be had for further details.

Referring to Figs. 10 and 11 a control lever 30 projects towards the operator and is adapted to be actuated to reload the main valve V and to store power in the spring e. The latch bar f' which had been moved by the lever 30, is held in position by the interference member $g^2$.

When the parts are so placed fluid under pressure is directed to the motor M and the head proceeds forward at a rapid rate. Just prior to the engagement between tool and work the feed dog engages and moves the interference bar $g^2$ one position and the valve automatically shifts to a position effecting a feed. The feed continues and the limit switch LS is actuated and the fixed stop FS encountered as in the previously explained machines and after the required time interval elapses the timing relay TD closes the circuit to the reverse solenoid $S^2$.

In the present machine the armature of the reverse solenoid is connected directly, through a bell-crank lever 31, to the trip plunger $g^2$, and when actuated withdraws same to a position such that the valve may be automatically shifted to the rapid traverse return position and the tool withdrawn from the work. Near the upper end of the travel of the tool head the dog $y$ engages and actuates the trip plunger $g^2$ and the valve is shifted to the "stop" position which brings the head to rest.

A second control lever 32 is provided to effect shifting of the valve to its stop position in cases of emergency or to render the automatic control devices normally ineffective when desired.

In all cases it is to be noted that the reverse solenoid and armature are so arranged that the trip plunger or interference bars are withdrawn or moved to the exact position required to position the valve to effect a reversal of the movement of the tool, the stop dog $y$ being relied upon to shift the plunger or interference bars to a position to effect stopping of the head and/or, if desired, a short circuiting of the pumps to the reservoir or the stopping thereof.

Normally the interference bars are urged and maintained in their effective positions by means of the springs as shown in the various figures, hence, the movement of the trip plungers do not overrun the critical point when actuated by the reversing solenoid. However, these last mentioned points concern the particular construction of the controlling devices employed on the machines here illustrated, and obviously the control devices of various other machines may be readily altered or adapted to my delayed reverse mechanism.

Figure 12:
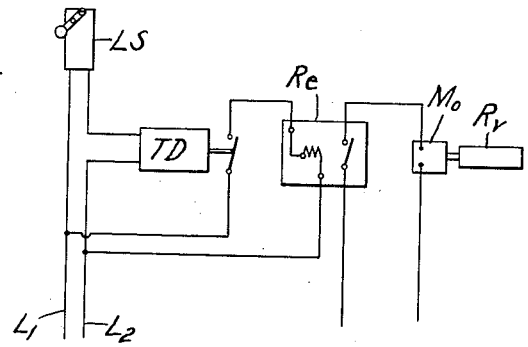
Fig. 12 is a diagrammatic view of a delayed reversing circuit similar to those hereinabove described but which incorporates an electrically operated time relay mechanism which in turn controls the main valve shifting solenoid or an auxiliary motor.

In certain adaptations of this invention it may be expedient to arrange the timing device so that at the expiration of a given period of time the same will function to complete the circuit of an auxiliary relay mechanism which in turn may be used to control the operation of the reversing solenoid or a motor operatively connected with the reversing mechanism of any given machine. Such an arrangement is depicted by the schematic diagram Fig. 12, in which LS represents the limit switch that controls the starting of a timing device TD. Upon the closing of the limit switch the timing device starts operating and after a definite time interval, functions to close the circuit of a relay mechanism Re. The relay in turn is connected to actuate one or more control switches of a reversing solenoid or an auxiliary motor Mo. Rv represents a reversing mechanism of any particular character and when the motor is actuated at the proper time, the desired movement of the machine is effected.

From the foregoing it will be perceived that this invention provides a reliable means for effecting a definite dwell in the movement of the head or carriage so that the tools carried thereby may take one or more finishing cuts and produce an accurately finished surface on the work before reversing occurs. This arrangement, it will be seen, is not subject to easy derangement or uncertainties in action that are common occurrences in prior devices and may be readily applied to various types of machines and adjusted to suit a wide range of particular needs.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A machine tool having an element adapted to be moved selectively in forward and reverse directions, combining an hydraulic transmission mechanism including a reversing valve for moving said element, means to shift said valve to a position effecting movement of said element in a forward direction; latch means for said valve; means for shifting same to a position effecting movement of said element in a reverse direction upon the release of said latch means; means for effecting a dwell at the end of the forward movement of said element, said means comprising a normally fixed abutment adapted to stop the forward movement of said element at a predetermined point in its travel; an electrically controlled time device rendered effective during the final forward movement of said element for releasing said latch means at a predetermined time subsequent to the engagement of said element with said fixed abutment; and means for adjustably controlling the action of said time device.

2. A machine tool combining an element adapted to be moved selectively in forward and reverse directions, an hydraulic transmission mechanism including a reversing valve for moving said element, means to shift said valve to a position effecting movement of said element in a forward direction; latch means for said valve; means normally effective to shift said valve to a position effecting movement of said element in a reverse direction upon the release of said latch means; means for positively stopping the forward movement of said element at a predetermined point in its travel; and electrically operated means controlled by the movement of said element for releasing said latch means subsequent to the engagement of said element with said fixed abutment, said electrically controlled means including a control switch, a positive acting time relay mechanism and an electric solenoid operatively connected with said latch mechanism and controlled by said time relay.

3. A machine tool having an element adapted to be moved selectively in forward and reverse directions, combining an hydraulic transmission mechanism including a reversing valve for moving said element, means to shift said valve to a position effecting movement of said element in a forward direction; latch means for said valve;

means for shifting same to a position effecting movement of said element in a reverse direction upon the release of said latch means; means for for effecting a dwell at the end of the forward movement of said element, said means comprising a normally fixed abutment adapted to stop the forward movement of said element at a predetermined point in its travel; an electrically controlled time device rendered effective during the final forward movement of said element for releasing said latch means at a predetermined time subsequent to the engagement of said element with said fixed abutment; means for adjustably controlling the action of said time device; and manually operable means for releasing said latch means independently of said electrically controlled device.

4. A machine tool combining an element adapted to be moved selectively in forward and reverse directions, an hydraulic transmission mechanism including a reversing valve for moving said element, means to shift said valve to a position effecting movement of said element in a forward direction; latch means for said valve; means normally effective to shift said valve to a position effecting movement of said element in a reverse direction upon the release of said latch means; means for positively stopping the forward movement of said element at a predetermined point in its travel; electrically operated means controlled by the movement of said element for releasing said latch means subsequent to the engagement of said element with said fixed abutment, said electrically controlled means including a control switch, a positive acting time relay mechanism and an electric solenoid operatively connected with said latch mechanism and controlled by said time relay; and means for releasing said latch mechanism independently of said electrically operated means.

ROBERT A. SCHAFER.